March 14, 1967     A. H. BORMAN, JR     3,308,687
TRANSMISSION
Filed Nov. 22, 1963
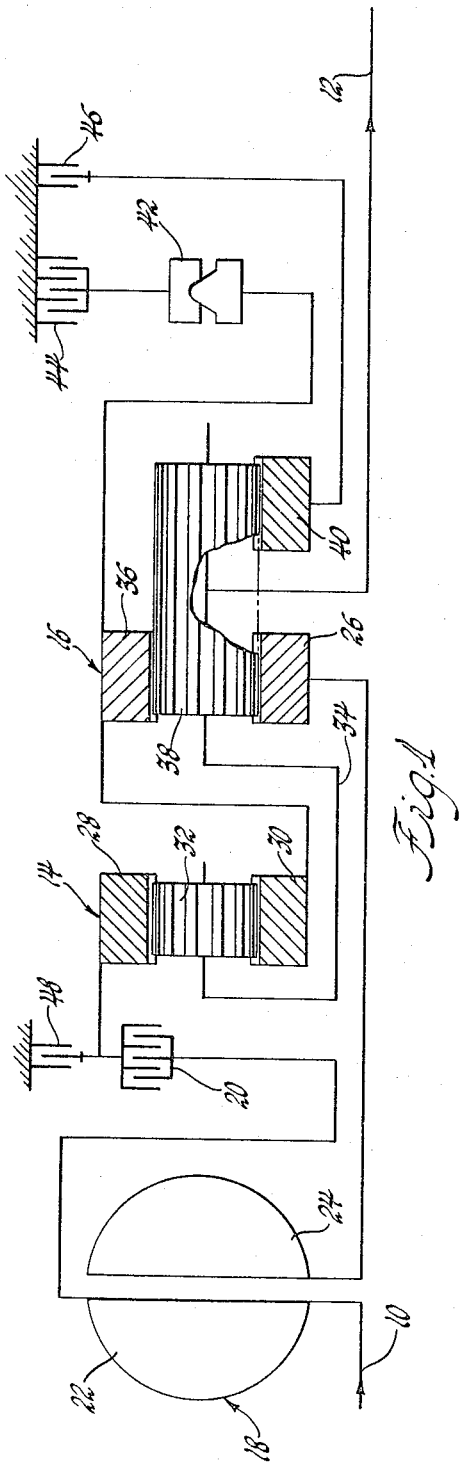
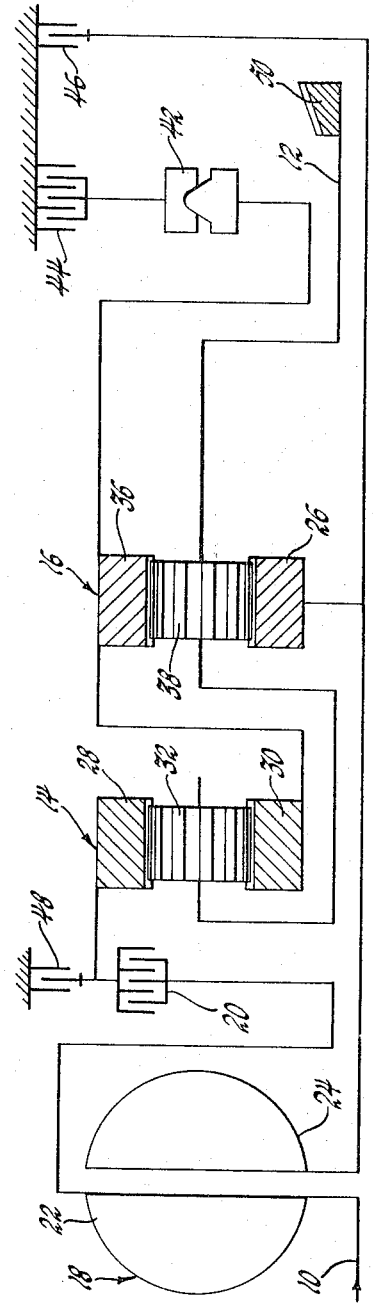
INVENTOR.
BY August H. Borman, Jr.
Hugh L. Fisher
ATTORNEY

United States Patent Office
3,308,687
Patented Mar. 14, 1967

3,308,687
TRANSMISSION
August H. Borman, Jr., Detroit, Mich., assignor to General Motors Corporation, Detroit, Mich., a corporation of Delaware
Filed Nov. 22, 1963, Ser. No. 325,606
9 Claims. (Cl. 74—760)

This invention relates to improvements in transmissions of the plural step ratio type.

Efforts are constantly being made to reduce the size of vehicle transmissions, particularly those that are installed in automobiles. This reduction in size requirements, although desirable, should not be accomplished by sacrificing to any great degree the over-all effectiveness of the transmission. For instance, if the transmission is of the plural step ratio type, a reduction in the number of available drive ratios to accommodate a decrease in transmission size is not generally acceptable. In fact, there is an increasing demand for more stepped ratios because a larger number of available drive ratios facilitates smoothness, the change in one ratio to another being less. With a larger number of ratios available, there is also less need for compromise as to what ratios are needed for what kind of driving.

Accordingly, a new and different transmission is proposed that requires a minimum number of elements for providing a maximum number of stepped drive ratios, that consumes a minimum of space, and that demands a minimum of actions to accommodate shifts from one drive ratio to another. Moreover, the invention contemplates a novel arrangement of a minimum number of transmission elements to achieve a maximum number of drive ratios in such a way as to render the transmission acceptable for many diverse installations.

The foregoing and other objects and advantages of the invention will be apparent from the following description and from the accompanying drawings, in which:

FIGURE 1 is a schematic diagram of a transmission incorporating the principles of the invention; and FIGURE 2 is a similar schematic diagram of a modification of the FIGURE 1 transmission.

Referring now to the drawings in detail and additionally to FIGURE 1, the numerals 10 and 12 designate generally driving and driven shafts that may be respectively connected in any conventional way to a vehicle engine and the drive wheels therefor. Interposed between the driving and driven shafts 10 and 12 are two planetary gear units, which hereinafter will be referred to as a front gear unit 14 and a rear gear unit 16. Drive to the front and rear gear units 14 and 16 is selectively provided by a pair of torque transmitting devices, such as a hydrodynamic torque transmitting device, in this instance a fluid coupling 18 and/or a friction clutch 20. As will be explained, the front and rear gear units 14 and 16 combine with the fluid coupling 18 and the friction clutch 20 to provide four forward drive ratios, one of which is an overdrive, and a reverse.

Commencing the detailed description of the transmission, the fluid coupling 18 is of the usual construction, comprising a pump or impeller 22 drive connected to the driving shaft 10 and a turbine 24 drive connected to an input sun gear 26 for the rear gear unit 16. The impeller 22 is also connected to the input side of the friction clutch 20 in any known way. The coupling 18 may be dumped and filled and when filled will, due to the circulation of the fluid therein, result in a torque being transmitted from the impeller 22 to the turbine 24.

The front gear unit 14 has a ring gear 28 joined to the output side of the friction clutch 20 so as to serve as an input and a sun gear 30 performing as a reactor. The ring gear 28 and the sun gear 30 are interrelated through one or more planet pinions 32 revolvably supported upon an output planet carrier 34. When, as will be further discussed, the reaction sun gear 30 is held and the friction clutch 20 is engaged by fluid pressure or any other conventional agency, the input ring gear 28 will, in being driven forwardly, cause the output planet carrier 34 to also be driven forwardly but at a slower speed.

In addition to the input sun gear 26 the rear gear unit 16 has a reaction ring gear 36 joined to the front gear unit reaction sun gear 30 and one or more planet pinions 38 revolvably supported on the same output planet carrier 34 as the front gear unit planet pinions 32. These planet pinions 38 intermesh with the sun gear 26 and the ring gear 36. The output planet carrier 34 is drive connected to the driven shaft 12 in any suitable way. With the reaction ring gear 36 held and the sun gear 26 acting as an input and rotating forwardly, the rear gear unit 16 impresses a positive torque upon the output planet carrier 34 causing it to rotate forwardly but at a lesser speed than the input sun gear 26.

The rear gear unit 16 further includes a second sun gear 40. The second sun gear 40 will be referred to as an overdrive sun gear and is identical in size to the sun gear 26. To permit the sun gear 40 to mesh with the pinions 38, the pinions 38 are shown elongated, but of course they can be made in other ways as long as the two portions meshing with the sun gears 26 and 40 are the same, i.e. have the same tooth numbers, and rotate together. As the name of the overdrive sun gear 40 implies, the sun gear 40 when held affords an overdrive ratio through the transmission, as will be discussed.

The front gear unit reaction sun gear 30 and the rear gear unit reaction ring gear 36 are both prevented from rotating backwards by the combination of a one-way device 42 and a forward brake 44, preferably of the disk type. The one-way device 42 may be of any known construction utilizing sprags, rollers or other type one-way elements for preventing relative rotation between two races in a selected direction, in this instance backwards. In this embodiment the one race is braked or held by the forward brake 44 such that neither of the reaction gears 30 or 36 can revolve backwards. However, they can revolve freely forwardly. By releasing the forward brake 44 a true neutral can be obtained through the transmission because the disengagement of the forward drive brake 44 renders the transmission completely incapable of transmitting any torque between the driving and driven shafts 10 and 12.

The overdrive sun gear 40 is prevented from rotation in this embodiment in either direction by an overdrive brake 46. The overdrive brake 46 is also preferably of the disk type.

Completing the transmission and enabling a reverse to be obtained is a reverse brake 48 situated in the front part of the transmission. The reverse brake 48 holds the front gear unit ring gear 28 and thereby establishes a reverse drive, as will be further explained in the operational summary.

Each of the brakes employed by the transmission can, as suggested with respect to the friction clutch 20, be operated in any known way, by fluid pressure, electrically, mechanically, etc. Although friction disk brakes have been described, these brakes may, by way of example, be in the form of cones or bands.

The operation of the transmission will be described in the same sequence as the shifts occur from a standing start. These various drive ratios will be designated as low speed, intermediate speed, direct drive, overdrive and reverse. Additionally, a true neutral, as has been discussed, can be obtained by disengaging the forward drive brake 44. Preferably, in neutral the friction clutch 20, the overdrive brake 46 and the reverse brake 48 are also disengaged, but the fluid coupling 18 is filled.

To commence forward drive, assuming that the transmission is in neutral, the only requirement is that the forward drive brake 44 be engaged. With the fluid coupling 18 already filled and ready to provide the needed fluid start, the rear gear unit 16 will be effective and drive will be from the driving shaft 10 through the fluid coupling 18 and to the rear gear unit input sun gear 26. As has been explained, rotation of the rear gear unit reaction ring gear 36, in this situation the gear 36 attempts to revolve backwards, will be inhibited by the one-way device 42 and the forward brake 44. Hence, a positive or forward driving torque is imposed on the output planet carrier 34 and accordingly the driving shaft 12. The ratio of the rear gear unit 16 is so selected that a maximum reduction is provided for the first or low speed drive.

To initiate the transition from the low speed drive to the intermediate speed drive requires that the fluid coupling 18 be drained and the friction clutch 20 engaged. Consequently, the rear gear unit input sun gear 26 loses its drive and the front gear unit 14 becomes effective since drive is now to the front gear unit input ring gear 28. The tendency for the front gear unit sun gear 30 to now revolve backwards is prevented in the same way as the rear gear unit ring gear 36, i.e. by the coaction of the one-way device 42 and the forward brake 44. Hence, the output carrier 34 is driven, and accordingly the driven shaft 12, at a slightly faster speed. The selection of the intermediate speed ratio for the front gear unit 14 is such that the driven shaft 12 is rotated faster than when revolved by the rear gear unit 16.

The establishment of a direct drive requires only that the fluid coupling 18 be filled. Consequently, drive from the driving shaft 10 is transferred part mechanically to the front gear unit 14 and part hydraulically to the rear gear unit 16. Since the front gear unit input ring gear 28 and the rear gear unit input sun gear 26 will be revolving at substantially the same speed, keeping in mind that there will be a slight differential due to the slippage through the fluid coupling 18, both the front and rear gear units 14 and 16 will for all practical purposes assume their so-called lock-up condition. This locked-up condition produces a substantially direct drive ratio between the driving shaft 10 and the driven shaft 12 because the different gears and pinions of the gear units 14 and 16 all will revolve together and at the same speed. At this time the one-way device 42 automatically disengages without requiring any disengagement of the forward drive brake 44.

The overdrive ratio requires two acts, namely the engagement of the overdrive brake 46 and the draining of the fluid coupling 18. This produces an unusual interaction of the various gear elements to produce an overall drive ratio that in effect causes the driven shaft 12 to be revolved faster than the driving shaft 10. To perhaps best understand this unique interaction, it will be assumed that each of the various gears have the tooth numbers indicated in the following table.

| Gear: | Number of teeth |
|---|---|
| Ring gear 28 | 65 |
| Pinion 32 | 17 |
| Sun gear 30 | 30 |
| Ring gear 36 | 63 |
| Pinion 38 | 16 |
| Sun gear 26 | 30 |
| Sun gear 40 | 30 |

In the overdrive ratio a forward driving torque will be transferred from the driving shaft 10 and via the friction clutch 20 to the front gear unit ring gear 28. This impresses a forward driving torque on the output planet carrier 34. Again, the front gear unit reaction sun gear 30 tries to go backwards and, of course, can except for the torque imposed thereon by the rear gear unit 16, the forward brake 44 being disengaged. However, since the overdrive sun gear 40 is held and since it has the same number of teeth as the input sun gear 26 and both mesh with the planet pinion 38, their actions will be duplicated and the holding of the overdrive sun gear 40 is equivalent to holding the sun gear 26. Now the forces causing the front gear unit sun gear 30 to rotate backwards and carry therewith the rear gear unit ring gear 36 in effect impose upon the output planet carrier 34 a negative torque which in the absence of any other restraint would actually cause the driven shaft 12 to go backwards. However, this negative torque is less than the positive torque contributed by the front gear unit 14 such that the overall result or the algebraic torque summation produces an overdrive. With the tooth numbers from the table the positive torque is equivalent to 1.46 times the input torque to the driving shaft 10, and the negative torque is .68 times input torque. The difference is a positive .78 times input torque and a very acceptable overdrive ratio.

For reverse drive, as mentioned, the reverse brake 48 is engaged, and the fluid coupling 18, of course, is filled to initiate the fluid start. All other brakes and clutches are at this time disengaged. The drive then from the fluid coupling 18 is initially to the input sun gear 26 for the rear gear unit 16. This forward rotation of the sun gear 26 causes the rear gear unit ring gear 36 to revolve backwards and carry therewith the front gear unit sun gear 30. With the front gear unit ring gear 28 held against forward rotation, which is induced by the backward rotation of the sun gear 30, the output planet carrier 34 is forced to revolve also backwards at whatever ratio is wanted. In this case with the tooth numbers selected, the ratio will be 3.55.

To demonstrate the versatility of the transmission a rearrangement is shown in FIGURE 2. The rearrangement involves connecting the driven shaft 12 to the rear axle gearing shown generally at 50. The overdrive brake 46 is as illustrated on the opposite side of the rear axle gearing 50 from the other parts of the transmission. Therefore, if the transmission is situated in the back end of the vehicle, adjacent to and in front of the rear axle gearing 50, it is very easy to add the overdrive ratio without substantial modification of the transmission. Assuming that the transmission has the described gearing affording the first three speeds, all that is necessary is to add some kind of housing for the overdrive brake 46, which can be attached in any appropriate way, e.g., to the rear axle housing, not shown. Moreover, the arrangement permits the overdrive brake 46 to directly brake the sun gear 26, eliminating the need for the sun gear 40.

From the foregoing it will be appreciated that an overdrive ratio has been afforded by the addition of one gear and one brake. Normally, if it is desired to add an overdrive, one complete planetary gear unit comprising ring, sun and planet pinions is required along with a planet carrier and a clutch for locking up the planetary gear unit during periods when the overdrive is not wanted and a brake to hold one of the gears for the overdrive, the conventional overdrive being obtained by supplying drive to the carrier and using either the sun gear or the ring gear as an output. This, of course, involves substantially many more parts and is in itself considerably more costly. In addition, there is more space required for this type of unit. In the FIGURE 2 modification the overdrive brake 46 can be added at the back side of the rear axle gearing and connected directly to the sun gear 26. Moreover, the gearing is not only particularly suited for this interaction to develop, in the described very unusual way, the overdrive ratio but also provides three basic ratios that require only a minimum of actions to shift from one drive ratio to another.

The invention is to be limited only by the following claims.

What is claimed is:

1. In a transmission, the combination of driving and driven shafts, first and second planetary gearing units each including an input gear, a reaction gear, and an output planet carrier having a planet pinion revolvably supported thereon so as to be in intermeshing relation with both the input and reaction gears, the output carrier for each gear unit being joined to the driven shaft, brake means operative for preventing rotation of both reaction gears in one direction, a plurality of torque transmitting devices, one of the torque transmitting devices being so arranged as to transfer drive from the driving shaft to the first gear unit input gear, another of the torque transmitting devices being so arranged as to transfer drive from the driving shaft to the second gear unit input gear, the first gear unit affording one drive ratio through the transmission when the one torque transmitting device is operative, the second gear unit affording another drive ratio through transmission when the another torque transmitting device is operative, both gear units combining when both torque transmitting devices are operative to provide a substantially direct drive through the transmission, the second gear unit also including an overdrive reaction gear arranged in intermeshing relation with the second gear unit planet pinion, and an overdrive brake for preventing rotation of the overdrive reaction gear, both gear units also combining when the another torque transmitting device is operative and the overdrive brake is effective to provide an overdrive ratio.

2. In a transmission, the combination of driving and driven shafts, first and second planetary gear units each including an input gear, a reaction gear, and an output planet carrier having a planet pinion revolvably supported thereon so as to be in intermeshing relation with both the input and reaction gears, the output planet carrier for each gear unit being joined to the driven shaft, brake means for preventing rotation of both reaction gears in one direction, the second gear unit also including another reactions gear, a brake operative to prevent rotation of the another reaction gear, a plurality of torque transmitting devices, one of the torque transmitting devices being so arranged as to transfer drive from the driving shaft to the first gear unit input gear, another of the torque transmitting devices being so arranged to transfer drive from the driving shaft to the second gear until input gear, the first gear unit affording one drive ratio through the transmission when the one torque transmitting device is operative, the second gear unit affording another drive ratio through the transmission when the another torque transmitting device is operative, both gear units combining when both torque transmitting devices are operative to provide a substantially direct drive ratio through the transmission, both gear units also combining when the another torque transmitting device is operative and the brake is operative to provide an overdrive ratio through the transmission.

3. In a transmission, the combination of drive and driven shafts, first and second planetary gear units each including a sun gear, a ring gear, and a planet carrier having a planet pinion revolvably positioned thereon so as to be in intermeshing relation with both the sun and ring gears, the planet carriers of each gear unit being joined to the driven shaft, the sun gear of the first gear unit being connected to the ring gear of the second gear unit, the second gear unit including another sun gear also in intermeshing relation with the second gear unit planet pinion, brake means including a one-way device operative to prevent rotation of the connected first gear unit sun gear and the second gear unit ring gear in one direction, the brake means when inoperative affording a neutral condition for the transmission, a brake operative to prevent rotation of the second gear unit another sun gear, a plurality of torque transmitting devices, one of the torque transmitting devices when operative transferring drive from the driving shaft to the first gear unit ring gear, another of the torque transmitting devices when operative transferring drive from the driving shaft to the second gear unit sun gear, the second gear unit being effective to afford a low speed forward drive through the transmission when the another torque transmitting device and the brake means are both operative, the first gear unit being effective to provide an intermediate speed drive when the one torque transmitting device and the brake means are both operative, both gear units combining when both the torque transmitting devices are operative and the brake means is inoperative to produce a substantially direct drive through the transmission and when the another torque transmitting device only is operative and the brake is operative to provide an overdrive ratio through the transmission.

4. In a transmission, the combination of drive and driven shafts, first and second planetary gear units each including a sun gear, a ring gear, and a planet carrier having a planet pinion revolvably positioned thereon so as to be in intermeshing relation with both the sun and ring gears, the planet carriers of each gear unit being joined to the driven shaft, the sun gear of the first gear unit being connected to the ring gear of the second gear unit, the second unit also including an overdrive sun gear also in intermeshing relation with the second planetary gear unit planet pinion, brake means including a one-way device operative to prevent rotation of the connected first gear unit sun gear and the second gear unit ring gear in one direction, the brake means when inoperative affording a neutral condition for the transmission, a brake operative to prevent rotation of the second gear unit overdrive sun gear, a hydrodynamic torque transmitting device operative to transfer drive from the driving shaft to the second gear unit sun gear, a friction clutch operative to transfer drive from the driving shaft to the first gear unit ring gear, the second gear unit being effective to afford a low speed forward drive through the transmission when the hydrodynamic torque transmitting device is operative, the first gear unit providing an intermediate speed drive when the friction clutch is operative, both gear units combining when both the hydrodynamic torque transmitting device and the friction clutch are operative to produce a substantially direct drive through the transmission and when only the friction clutch is operative and the brake is operative to hold the second gear unit overdrive sun gear to produce an overdrive ratio through the transmission.

5. In a transmission, the combination of an input drive connected to a source of positive torque, an output drive connected to a load, first and second planetary gear units each including a sun gear, a ring gear, and a planet carrier having a planet pinion revolvably positioned thereon so as to be intermeshing relation with both the sun and ring gears, the planet carriers of each gear unit being drive connected to the output, the sun gear of the first gear unit being connected to the ring gear of the second gear unit, means selectively operable to drive connect the ring gear of the first gear unit and the sun gear of the second gear unit to the input, an overdrive brake operative to prevent rotation of the second gear unit sun gear, the first and second planetary gear units providing certain individual drive ratios so that with the first gear unit ring gear drive connected to the input by the selectively operable means so as to have a positive torque imposed thereon by the input and with the overdrive brake operative the planet carriers have imposed thereon positive and negative torques the sum of which causes the output to be overdriven relative to the input, and an underdrive brake operative to hold the first gear unit sun gear and the second gear unit ring gear so that with either the second gear unit sun gear or the first gear unit ring gear drive connected to the input by the selectively operable means the output is underdriven relative to the input.

6. In a transmission, the combination of first and second planetary gear units, the first planetary gear unit having an input gear, a reaction gear, and an output planet carrier having a planet pinion revolvably posiioned thereon so as to be in intermeshing relation with the input and reaction gears, the second planetary gear unit having an input gear connected to the first planetary gear unit reaction gear, a reaction gear, and a planet carrier having a planet pinion revolvably positioned thereon so as to be in intermeshing rotation with both the input gear and the reaction gear, the first and second planetary gear unit planet carriers being joined together, means selectively operable to drive connect the first gear unit input gear to a source of torque, an overdrive brake operative to prevent rotation of the second gear unit reaction gear, the first and second planetary gear units providing certain individual drive ratios so that with the overdrive brake operative and with the first gear unit input gear drivingly connected to the source of torque by the selectively operable means the first and second gear unit planet carriers have respectively imposed thereon positive and negative torques the sum of which causes the planet carriers to be overdriven relative to the first planetary gear unit input gear, and an underdrive brake operative to hold the first gear unit reaction gear so that with the first gear unit input gear drivingly connected to the source of torque by the selectively operable means the planet carriers are under-driven relative to the first planetary gear unit input gear.

7. In a transmission, the combination of first and second planetary gear units, the first planetary gear unit comprising an input, a reactor and an output, the second planetary gear unit comprising an input connected to the first gear unit reactor, an output connected to the first gear unit output and a reactor, means selectively operable to drive connect the first gear unit input to a source of torque, an overdrive brake operative for holding the second gear unit reactor against rotation in one direction, the first and second gear units providing certain individual drive ratios so that with the overdrive brake operative and with the first gear unit input drive connected to the source of torque by the selectively operable means the outputs have imposed thereon positive and negative torques, the sum of which will cause the outputs to be driven at a faster speed than the first gear unit input, and an underdrive brake operative to hold the first gear unit reactor so that with the first gear unit input drive connected by the selectively operable means to the source of torque the outputs are driven at a slower speed than the first gear unit input.

8. In a transmission, the combination of driving and driven shafts, first and second planetary gearing units providing certain individual drive ratios and each including an input gear, a reaction gear, and an output planet carrier having a planet pinion revolvably supported thereon so as to be in intermeshing relation with both the input and reaction gears, the output carrier for each gear unit being joined to the driven shaft, brake means operative for preventing rotation of both reaction gears in one direction, a plurality of releasable torque transmitting devices, one of the torque transmitting devices being so arranged when operative as to transfer drive from the driving shaft to the first gear unit input gear, another of the torque transmitting devices being so arranged when operative as to transfer drive from the driving shaft to the second gear unit input gear, the first gear unit affording one drive ratio through the transmission when the one torque transmitting device is operative, the second gear unit affording another drive ratio through the transmission when the other torque transmitting device is operative, both gear units combining when both torque transmitting devices are operative to provide a substantially direct drive through the transmission, and an overdrive brake for preventing rotation of the second gear unit input gear, both gear units also combining when the another torque transmitting device is operative and the overdrive brake is effective to provide an overdrive ratio.

9. The transmission described in claim 8 wherein the second gear unit input gear is the sun gear, the first gear unit input gear is the ring gear and the one torque transmitting device is a hydrodynamic torque transmitting device and the other torque transmitting device is a friction clutch.

References Cited by the Examiner
UNITED STATES PATENTS

| | | | |
|---|---|---|---|
| Re. 24,619 | 3/1959 | Simpson | 74—688 X |
| 2,395,459 | 2/1946 | Carnagua | 74—761 X |
| 2,657,592 | 11/1953 | Burtnett | 74—688 |
| 2,736,407 | 2/1956 | Smirl | 74—688 X |
| 2,890,602 | 6/1959 | Smirl et al. | 74—688 |
| 2,964,975 | 12/1960 | De Lorean | 74—677 |
| 3,008,349 | 11/1961 | Winchell et al. | 74—763 X |
| 3,030,824 | 4/1962 | Moore | 74—761 X |
| 3,031,901 | 5/1962 | Simpson | 74—763 X |
| 3,041,891 | 7/1962 | Black et al. | 74—781 X |
| 3,073,183 | 1/1963 | Kelley | 74—759 X |
| 3,084,568 | 4/1963 | O'Malley | 74—677 |
| 3,088,339 | 5/1963 | Black | 74—677 X |
| 3,106,107 | 10/1963 | Hardy | 74—767 X |
| 3,147,635 | 9/1964 | Fisher | 74—677 X |

FOREIGN PATENTS

| | | |
|---|---|---|
| 626,403 | 8/1961 | Canada. |
| 809,863 | 3/1959 | Great Britain. |

DAVID J. WILLIAMOWSKY, *Primary Examiner.*

J. R. BENEFIEL, *Assistant Examiner.*